(12) United States Patent
Brunneke

(10) Patent No.: US 8,251,605 B2
(45) Date of Patent: Aug. 28, 2012

(54) BALL AND SOCKET JOINT

(75) Inventor: Hans-Gerd Brunneke, Georgsmarienhütte (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 707 days.

(21) Appl. No.: 12/295,098

(22) PCT Filed: Apr. 23, 2007

(86) PCT No.: PCT/DE2007/000718
§ 371 (c)(1),
(2), (4) Date: Sep. 29, 2008

(87) PCT Pub. No.: WO2007/124721
PCT Pub. Date: Nov. 8, 2007

(65) Prior Publication Data
US 2009/0245928 A1    Oct. 1, 2009

(30) Foreign Application Priority Data

Apr. 28, 2006 (DE) .......................... 10 2006 020 397

(51) Int. Cl.
*F16C 11/00* (2006.01)

(52) U.S. Cl. ........ 403/127; 403/122; 403/128; 403/133; 403/135

(58) Field of Classification Search .................. 403/127, 403/128, 130, 132–133, 135; 384/558, 612, 384/206, 211, 212
See application file for complete search history.

(56) References Cited

U.S. PATENT DOCUMENTS

| 1,983,655 A | 12/1934 | Bowman et al. |
| 2,074,748 A | 3/1937 | Hufferd et al. |
| 2,421,588 A | 6/1947 | Venditty |
| 2,544,583 A | 3/1951 | Booth |
| 2,645,510 A | 7/1953 | Booth |
| 2,852,288 A * | 9/1958 | Booth ........................... 403/127 |
| 2,865,688 A * | 12/1958 | Lemont, Jr. ................... 384/558 |
| 2,954,993 A | 10/1960 | Scheublein, Jr. et al. |
| 2,998,262 A * | 8/1961 | Hoffman ................ 280/124.136 |
| 3,007,728 A * | 11/1961 | Hoffman ....................... 403/132 |
| 3,381,987 A * | 5/1968 | Husen ............................. 403/51 |
| 4,828,404 A * | 5/1989 | Takata ........................... 384/450 |
| 4,986,689 A * | 1/1991 | Drutchas ....................... 403/127 |
| 4,995,755 A * | 2/1991 | Hyodo et al. ................. 403/133 |
| 5,997,208 A * | 12/1999 | Urbach et al. ................ 403/137 |
| 7,357,591 B2 * | 4/2008 | Broker et al. ................ 403/132 |

FOREIGN PATENT DOCUMENTS

| DE | 36 05 583 A1 | 8/1986 |
| EP | 0 343 881 A1 | 11/1989 |
| GB | 2 171 449 | 8/1986 |

OTHER PUBLICATIONS

Timken "tapered roller bearings," Apr. 4, 2005; retrieved May 16, 2011 from Internet Archive (http://replay.web.archive.org/20050404084443/http://www.timken.com/products/bearings/products/TaperedRollerBearings/overview.asp).*

* cited by examiner

*Primary Examiner* — Victor MacArthur
*Assistant Examiner* — Eric Chau
(74) *Attorney, Agent, or Firm* — McGlew and Tuttle, P.C.

(57) ABSTRACT

A ball and socket joint, especially for the wheel suspension of a motor vehicle, with a ball pivot (1), which is equipped with a first spheroidal bearing surface (3) mounted pivotably and rotatably in a housing (2). A roller bearing (5) is present between the first spheroidal bearing surface (3) and another spheroidal bearing surface (4), which is mounted in the housing (2) and is connected to the ball pivot (1). The roller bearing (5) is a roller bearing transmitting radial and axial forces.

20 Claims, 1 Drawing Sheet

BALL AND SOCKET JOINT

CROSS REFERENCE TO RELATED APPLICATIONS

This application is a United States National Phase application of International Application PCT/DE 2007/000718 and claims the benefit of priority under 35 U.S.C. §119 of German Patent Application DE 10 2006 020 397.6 filed Apr. 28, 2006, the entire contents of which are incorporated herein by reference.

FIELD OF THE INVENTION

The present invention pertains to a ball and socket joint, especially for the wheel suspension of a motor vehicle, which a ball pivot, which is equipped with a first spheroidal bearing surface mounted pivotably and rotatably in a housing, wherein a roller bearing is present between the first spheroidal bearing surface and another spheroidal bearing surface, which is mounted in the housing and is connected to the ball pivot.

BACKGROUND OF THE INVENTION

Ball and socket joints, as they are used especially for wheel suspensions in motor vehicles, are at times subject to extreme loads, which may consist of mechanical stresses or are caused by thermal or chemical effects. They are currently designed such that they do not have to be replaced and do not require maintenance under normal circumstances during the service life of a motor vehicle.

Ball and socket joints are subject in motor vehicles to radial and axial forces, which may at times assume considerably high values. In addition, the ball pivot must make possible a rotary motion about its central axis. The torques and moments of friction that can be observed in the ball and socket joint also increase with increasing size of a ball and socket joint. This has an adverse effect especially in the area of the steering, because increased forces are to be applied here in order to guarantee steerability of the motor vehicle. Moreover, high torques and moments of friction within the ball and socket joint lead to wear as well as to the risk that specifications mandated by law concerning the steering return cannot be met.

To reduce the torques and moments of friction within a ball and socket joint, for example, the ball and socket joints known from U.S. Pat. No. 2,954,993 and U.S. Pat. No. 2,645,510 have a ball pivot, which is equipped with a spheroidal bearing surface mounted pivotably and rotatably in a housing, wherein a roller bearing is present between the first spheroidal bearing surface and another spheroidal bearing surface, which is mounted in the housing and is connected to the ball pivot. Single-row deep groove ball bearings are used as roller bearings according to the disclosure contents of said documents. The joint ball comprises in these solutions two separate individual parts each, said roller bearing being accommodated between the parts of the joint ball. As a consequence of the low rolling friction of the roller bearings, a rotary motion of the ball pivot can be converted with such a ball and socket joint with very low moments of friction.

However, the ball and socket joints known from said documents also have drawbacks. For example, there are metallic, spheroidal bearing surfaces, which are mounted directly in a housing likewise consisting of a metal. Due to the metal-on-metal contact pairing, vibrations introduced from the road surface via the wheel suspension and the ball and socket joint located therein are passed on to the components of the motor vehicle accommodating the ball and socket joint directly, i.e., without absorption, and they can therefore be felt by the driver of the vehicle. However, this is associated with a reduction of comfort, which is not acceptable. It is, moreover, necessary as a consequence of the bearing pairing used to perform maintenance on the ball and socket joints at regular intervals. Maintenance consists in this case of the need to refill grease via lubricant filling openings present on the ball and socket joint.

However, the essential drawback of the ball and socket joint designs known from U.S. Pat. No. 2,954,993 and U.S. Pat. No. 2,645,510 can be seen in the fact that the roller bearings used are designed exclusively for loading in the axial direction relative to the non-deflected ball pivot. The roller bearings used here are not suitable for absorbing and passing on radial forces.

Moreover, the problem arises in such roller bearings that the clearance also increases with the roller bearing when wear develops on the joint and an associated loosening of the inner components of the joint occurs. However, it can happen as a result that the rollers will be displaced and jammed and their trouble-free operation is thus not guaranteed any longer. The consequence inevitably arising from this for the ball and socket joint in question would be that the ball and socket joint would have to be replaced as a whole.

Another solution appears from U.S. Pat. No. 2,544,583. The ball and socket joint described there is designed for wheel suspensions in motor vehicles. It has a ball pivot, which is equipped with a first spheroidal bearing surface mounted pivotably and rotatably in a housing, wherein a roller bearing is present between the first spheroidal bearing surface and another spheroidal bearing surface, which is mounted in the housing and is connected to the ball pivot. The roller bearing described in this document is a cylindrical roller bearing. Such cylindrical roller bearings are suitable for absorbing strong radial forces relative to the axis of rotation of the rollers. However, cylindrical roller bearings can transmit only extremely weak axial forces at best. Such a ball and socket joint can have very limited use only in case of the complex loads to which a ball and socket joint is subject in a motor vehicle, which also involve superimposed force and torque effects in the axial as well as radial directions. The embodiment described in this document is also a metal-on-metal bearing, because both the parts of the joint ball and the housing are manufactured from a metallic material and form a direct contact pair. The joint according to U.S. Pat. No. 2,544,583 therefore also requires permanent maintenance at fixed time intervals, which is carried out by greasing, as in the ball and socket joints described before, which are known from the state of the art. The ball and socket joint described in U.S. Pat. No. 2,544,583 also has a lubricant filling opening for this purpose.

SUMMARY OF THE INVENTION

The basic object of the present invention is to provide a ball and socket joint, which is able to absorb and correspondingly compensate both axial and radial loads via the ball pivot. The ball and socket joint should have a simple design and thus be able to be manufactured at a low cost.

The inventor correspondingly proposes to perfect a ball and socket joint with a ball pivot, which is equipped with a first spheroidal bearing surface mounted pivotably and rotatably in a housing, wherein a roller bearing is present between the first spheroidal bearing surface and another spheroidal bearing surface, which is mounted in the housing and is connected to the ball pivot, such that the roller bearing is a roller bearing transmitting radial and axial forces.

A ball and socket joint thus equipped is characterized especially by extremely low torques and moments of friction about the longitudinal axis of the ball pivot. Strong axial and radial forces can be transmitted at the same time. Clearances that may possibly develop between the components of the joint in the course of the service life of such a ball and socket joint can be compensated by the roller bearing according to the present invention, so that no effects on the ability of the ball and socket joint to be used further are to be feared. The design of a ball and socket joint according to the present invention has created the possibility of completely separating the rotary motion of the ball pivot about its axial central axis from the pivoting motion of the ball pivot. Thus, completely new design possibilities arise, on the whole, for designing such ball and socket joints. An inexpensive variant of a ball and socket joint is made available, which considerably reduces the manufacturing effort and hence the manufacturing costs due to the simple design.

According to a first advantageous embodiment of the present invention, the inventors propose that the roller bearing form a double-row angular ball bearing, a taper roller bearing or a spherical roller bearing. These above-mentioned types of roller bearings are each suitable for receiving both axial and radial loads and transmitting such directed forces in the manner according to the present invention.

The design of a double-row spherical roller bearing corresponds to a pair of single-row angular ball bearings in an O arrangement. Such bearings have very narrow clearances due to their design.

The aforementioned taper roller bearings are characterized by a very high load-bearing capacity and can absorb combined and complex loads. It may become necessary for absorbing axial forces to provide a second taper roller bearing arranged in a mirror-inverted manner in order to thus make countersupport possible.

The spherical roller bearings being proposed are suitable for very heavy loads. Two rows of barrel-shaped rollers run on a hollow spherical track in such a spherical roller bearing. The rollers are guided at fixed rims, so that axial forces can also be absorbed as a result, besides the radial loads. One of these roller bearings may be selected depending on the intended use of the ball and socket joint according to the present invention.

Another essential advantage of the present invention is seen by the inventors in the fact that the axis of rotation of the rollers of the roller bearings forms an angle with the longitudinal axis of the ball pivot. This means, from a practical point of view, that the rollers are in an oblique position. It becomes possible due to this arrangement of the rollers to improve the absorption of both radial and axial loads without the favorable properties of the ball and socket joint, which can be seen especially in the extremely low friction during rotary motion of the ball pivot, being reduced.

According to another embodiment of this idea, the angle may be between 0° and 90°. However, arrangements of the rollers in relation to the longitudinal axis of the ball pivot at an angle of 45° are preferred. It was found that the arrangement at 45°, in particular, makes possible a very advantageous transmission of forces and can thus best meet the requirements imposed on the ball and socket joint.

It is, moreover, proposed in connection with a simplified manufacture and the associated cost reduction in the manufacture of ball and socket joints according to the present invention to create a kind of modular system. Accordingly, one solution according to the present invention proposes that the ball pivot have an at least two-part joint ball and that the roller bearing be accommodated within the joint ball assembled. The at least two-part design of the joint ball leads to leeway in terms of design, which makes possible a high level of variability of the individual components depending on the requirements imposed on the joint. The great flexibility is associated with the possibility of using standardized components.

The inventors perfected this inventive idea described above to the extent that the rollers can be arranged loosely in running track surfaces suitable for this between the corresponding joint ball parts. This means that no roller bearings finished in advance need to be used to implement the solution according to the present invention, but it is thus possible to embody a very simple mounting of the ball and socket joint according to the present invention by means of a running track within the joint ball parts corresponding to one another and rollers inserted therein and, moreover, to provide the arrangement of the rollers between the joint ball parts in a desired manner. It is thus also possible without difficulties to implement the oblique positions of the rollers mentioned in the introduction relative to the longitudinal axis of the ball pivot. The running track surfaces provided within the joint ball parts must only be suitable for accommodating and correspondingly guiding the rollers.

One embodiment of the present invention can be seen in the fact that the roller forms a rotating track within the ball and socket joint.

To improve comfort and to reduce the transmission of structure-borne noise in a ball and socket joint according to the present invention, the inventors propose, furthermore, to mount the joint ball as a whole pivotably in a bearing shell accommodated in the housing. Such a bearing shell has the advantage that it reduces, i.e., absorbs vibrations introduced via the ball and socket joint, on the one hand, and eliminates the need for maintenance for the ball and socket joint, on the other hand. Due to the use of an elastic bearing shell, it is consequently unnecessary to lubricate the ball and socket joint later at specified maintenance intervals. Suitable materials for the bearing shell are known from the state of the art. For example, materials such as POM, PEEK or similar materials with good tribological properties, which reduce the overturning moments to a minimum in this case, can be used especially advantageously. Some of these maintenance-free materials possess self-lubricating properties, and they also lead, moreover, to the above-mentioned absorbing properties.

A retaining ring may be used to fix the bearing shell within the housing. This retaining ring is also suitable for elastically prestressing the bearing shell to a limited extent. This leads to the essential advantage that the bearing shell will be automatically restressed even in case of wear due to abrasion in the course of the service life of the ball and socket joint, so that the joint components will not become loose within the ball and socket joint. The ball and socket joint according to the present invention is thus designed for a very long service life under extremely high radial as well as axial loads. The retaining ring can be fixed in the housing, for example, by deforming a partial area of the rim of the housing, and it fixes at the same time the bearing shell in the above-described manner.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
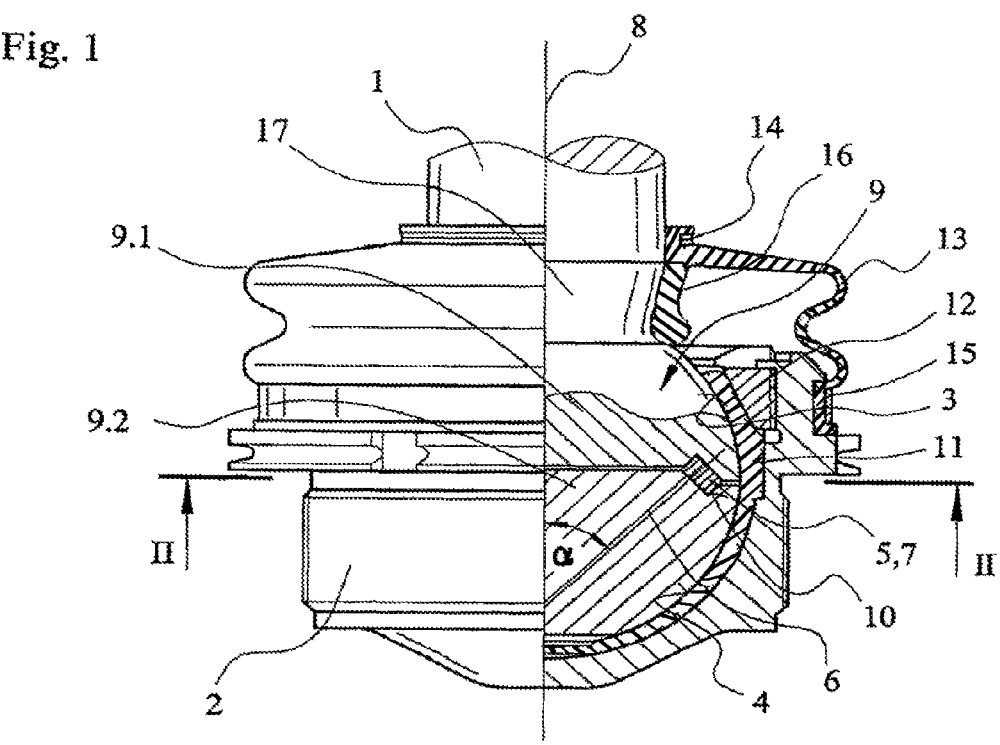
FIG. 1 is a partial cross sectional view of an example of a ball and socket joint according to the present invention.

Referring to the drawings in particular, FIG. 1 shows an example of an embodiment variant of a ball and socket joint according to the present invention as a partial section. This ball and socket joint has a ball pivot 1, which is mounted pivotably and rotatably in a housing 2. In the example being shown, the housing-side end area of the ball pivot 1 has a first spheroidal bearing surface 3, which forms a joint ball designated as a whole by 9 together with a second spheroidal bearing surface 4 connected to the ball pivot 1.

A roller bearing 5 is inserted between the joint ball parts 9.1 and 9.2. This roller bearing 5 comprises running tracks 10, which are present in the joint ball parts 9.1 and 9.2 and into which numerous rollers 7 are inserted loosely. The peculiarity according to the present invention is that the rollers 7 assume an oblique position in relation to the central longitudinal axis 8 of the ball pivot 1. An oblique position is defined here as a sloped installation position, in which the axis of rotation 6 of the rollers forms an angle with the central longitudinal axis 8 of the ball pivot 1. In the exemplary embodiment of a ball and socket joint according to the present invention shown in FIG. 1, the angle=45°. This positioning of the rollers 7 between the joint ball parts 9.1 and 9.2 makes possible the optimal transmission of the axial forces and radial loads of the ball and socket joint introduced onto the ball pivot 1. The joint ball 9 is mounted as a whole pivotably within a bearing shell 11. The roller bearings 5 ensure the reduction of the moments of friction of the rotary motion of the ball pivot 1, while the pivoting motion of the ball pivot 1 within the housing 2 will have predefined coefficients of friction due to the bearing shell 11.

The ball and socket joint shown in the exemplary embodiment according to FIG. 1 has a housing 2 that is open on one side. A retaining ring 12, which is fixed by deforming a housing area at least partially, is present in the opening-side area of housing 2. The retaining ring 12 is used to fix the bearing shell and with it the joint ball 9 of the ball pivot 1, which joint ball is removed within the housing 2, in its position. It is advantageous for this that the bearing shell 11 is manufactured from a plastic and possesses elastic properties. An automatic adjustment of the joint components is also made possible by this elasticity of the bearing shell 11 should a clearance develop between the components of the bearing in the course of the service life of the ball and socket joint. The ball and socket joint as a whole is consequently maintenance-free over the entire designed service life. A sealing bellows 13 is used to protect the inner joint components from the entry of moisture and dirt. On the one hand, this sealing bellows is attached sealingly to the ball pivot 1. On the other hand, the sealing bellows 13 with its second edge area is in contact with the housing 2. In addition, straining rings 14 and 15 are arranged in the respective edge areas of the sealing bellows 13 to improve the sealing action. These straining rings fix the sealing bellows to the components. In addition, a sealing bellows retaining ring 16 is provided in the area of the neck 17 present at the ball pivot 1 to avoid an axial motion of the edge of the sealing bellows that is in contact with the ball pivot 1 in the direction of the inner components of the joint. This sealing bellows retaining ring supports the edge of the sealing bellows and fixes same at the ball pivot 1.

Figure 2:
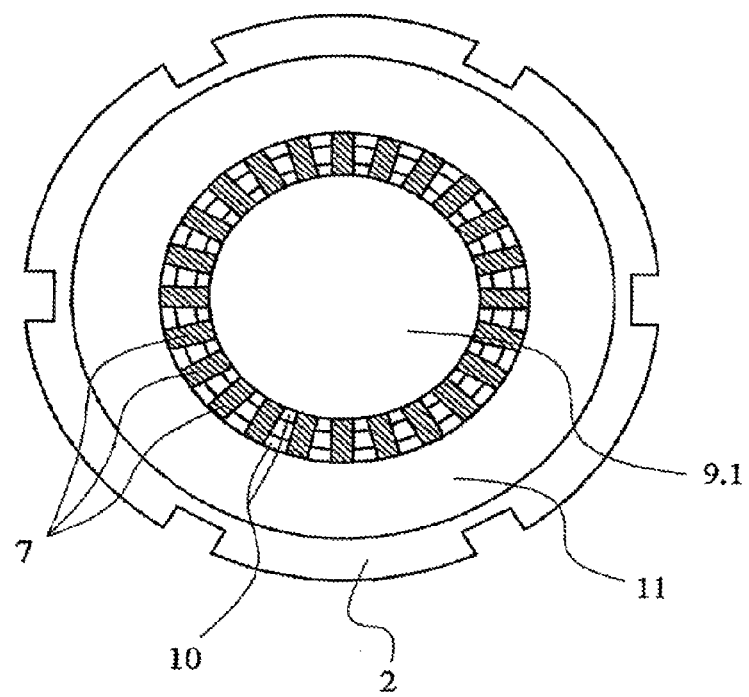
FIG. 2 is a sectional view taken along line II-II from FIG. 1.

FIG. 2 shows a sectional view according to section II-II in FIG. 1. The design of the roller bearings 5 can be determined from this. The view in FIG. 2 shows a view of the first joint ball component 9.1 in the area of the roller bearings 5 inserted into it. Running tracks 10, into which loose rollers 7 are inserted in this exemplary embodiment, are provided for this purpose in the joint ball part 9.1. A corresponding opposite running track is located in the second joint ball part 9.2 not visible in FIG. 2. The joint ball is mounted as a whole within the bearing shell 11, which is in turn inserted into housing 2. The individual components are shown in a schematic simplified form in the view shown in FIG. 2 in order to explain only the principle of the present invention. The rollers 7 being guided within the running tracks 10 form as a whole a rotating track within the joint ball 9 of the ball pivot 1.

It is obvious that the above-mentioned features of the present invention can be used not only in the particular combination described, but in other combinations or alone as well, without going beyond the scope of the present invention. Effecting a mechanical reversal of the individual mechanical elements of the present invention is also within the scope of the present invention.

While a specific embodiment of the invention has been shown and described in detail to illustrate the application of the principles of the invention, it will be understood that the invention may be embodied otherwise without departing from such principles.

The invention claimed is:

1. A ball and socket joint for a wheel suspension of a motor vehicle, the ball and socket joint comprising:

a housing;

a ball pivot with a pivot spheroidal bearing surface mounted pivotably and rotatably in said housing;

another spheroidal bearing surface mounted in said housing and connected to said ball pivot, said ball pivot comprising a joint ball, said joint ball comprising a first spheroidal part and a second spheroidal part, said first spheroidal part comprising said pivot spheroidal bearing surface and said second spheroidal part comprising said another spheroidal bearing surface, the first spheroidal part and second spheroidal part having axial faces opposing each other, said axial face of the first spheroidal part comprising a first part annular groove formed by a first part flat angular first surface or first part planar angular first surface and a first part flat angular second surface or first part planar angular second surface extending substantially perpendicular to the first part flat angular first surface or first part planar angular first surface, said axial face of the second spheroidal part comprising a second part annular groove formed by a second part flat angular first surface or second part planar angular first surface and a second part flat angular second surface or second part planar angular second surface extending substantially perpendicular to the second part flat angular first surface or second part planar angular first surface, wherein the first part flat angular first surface or first part planar angular first surface is at an angle greater than 0° and less than 90° with respect to a longitudinal axis of the ball pivot and wherein the second part flat angular first surface or second part planar angular first surface is at an angle greater than 0° and less than 90° with respect to the longitudinal axis of the ball pivot;

a cylindrical or conical roller bearing between said pivot spheroidal bearing surface and said another spheroidal bearing surface, said cylindrical or conical roller bearing comprising a flat or planar roller bearing surface, an upper roller bearing surface and a lower roller bearing surface, said first part flat angular first surface or first part planar angular first surface and said second part flat angular first surface or second part planar angular first surface engaging at least a portion of said flat or planar roller bearing surface, said first part flat angular second surface or first part planar angular second surface engaging at least a portion of said upper roller bearing surface, said second part planar angular second surface or second part planar angular second surface engaging at least a portion of said lower roller bearing surface, said cylindrical or conical roller bearing transmitting radial and axial forces between said pivot spheroidal bearing surface and said another spheroidal bearing surface.

2. A ball and socket joint in accordance with claim 1, wherein said cylindrical or conical roller bearing forms a double-row angular ball bearing or a taper roller bearing.

3. A ball and socket joint in accordance with claim 1, further comprising:
a bearing shell composed of plastic, said first spheroidal bearing surface and said second spheroidal bearing surface defining an axial gap extending in a radial direction of said joint ball with respect to a longitudinal axis of said ball pivot, said first part flat angular first surface or first part planar angular first surface and said second part flat angular first surface or second part planar angular first surface being at an angular surface angle with respect to said axial gap, at least said first part flat angular first surface or first part planar angular first surface, said first part flat angular second surface or first part planar angular second surface, said second part flat angular first surface or second part planar angular first surface and said second part flat angular second surface or second part planar angular second surface defining a roller bearing space, said roller bearing space being at a roller bearing space angle with respect to said axial gap, said cylindrical or conical roller bearing being arranged in said roller bearing space, wherein said cylindrical or conical roller bearing is at a roller bearing angle with respect to said axial gap, said first part flat angular first surface or first part planar angular first surface being parallel to said second part flat angular first surface or second part planar angular first surface, said first part flat angular second surface or first part planar angular second surface being parallel to said second part flat angular second surface or second part planar angular second surface, said bearing shell being in contact with said joint ball, wherein an axis of rotation of rollers of said cylindrical or conical roller bearing forms an angle with a longitudinal axis of said ball pivot.

4. A ball and socket joint in accordance with claim 3, wherein said angle of said axis of rotation of rollers of said cylindrical or conical roller bearing with respect to said longitudinal axis of said ball pivot is between 0° and 90°, said first part flat angular first surface or first part planar angular first surface being opposite said second part flat angular first surface or second part planar angular first surface, said first part flat angular second surface or first part planar angular second surface being opposite said second part flat angular second surface or second part planar angular second surface.

5. A ball and socket joint in accordance with claim 3, wherein said angle of said axis of rotation of rollers of said cylindrical or conical roller bearing with respect to said longitudinal axis of said ball pivot is about 45°, said cylindrical or conical roller bearing comprising rollers arranged in running track surfaces between said first part and said second part of said joint ball, said running track surfaces being at a running track surface angle with respect to said axial gap.

6. A ball and socket joint in accordance with claim 1, wherein
said cylindrical or conical roller bearing is accommodated within the joint ball.

7. A ball and socket joint in accordance with claim 6, wherein said cylindrical or conical roller bearing includes rollers arranged loosely in running track surfaces between said first part and said second part of said joint ball.

8. A ball and socket joint in accordance with claim 6, further comprising a plastic bearing shell accommodated in said housing, wherein said joint ball as a whole is mounted pivotably in said bearing shell, said cylindrical or conical roller bearing comprising a row of barrel-shaped rollers.

9. A ball and socket joint in accordance with claim 8, wherein said plastic bearing shell is manufactured from a material possessing elastic properties.

10. A ball and socket joint in accordance with claim 8, further comprising a retaining ring wherein said bearing shell is positioned in said housing by said retaining ring.

11. A ball and socket joint in accordance with claim 1, wherein said cylindrical or conical roller bearing forms a rotating track.

12. A ball and socket joint comprising:
a joint housing;
a ball pivot with a pivot pin and a joint ball with a first part including a first spheroidal bearing surface and a second part including a second spheroidal bearing surface, said joint ball being mounted pivotably and rotatably in said housing; and
at least one of a cylindrical roller bearing and a conical roller bearing between said first spheroidal bearing surface and said second spheroidal bearing surface, said first spheroidal bearing surface and said second spheroidal bearing surface having axial faces opposing each other and defining an axial gap extending in a radial direction of said joint ball with respect to a longitudinal axis of said ball pivot, said axial face of the first spheroidal bearing surface comprising an annular groove formed by a first part flat angular first surface or first part planar angular first surface and a first part flat angular second surface or first part planar angular second surface extending substantially perpendicular to the first part flat angular first surface or first part planar angular first surface, said axial face of the second spheroidal bearing surface comprising an annular groove formed by a second part flat angular first surface or second part planar angular first surface and a second part planar angular first surface or second part planar angular second surface extending substantially perpendicular to the second part flat angular first surface or second part planar angular first surface, said first part flat angular first surface or first part planar angular first surface and said second part flat angular first surface or second part planar angular first surface being at an angle greater than 0° and less than 90° with respect to said axial gap, at least said first part flat angular first surface or first part planar angular first surface and said second part flat angular first surface or second part planar angular first surface defining a roller bearing space, said roller bearing space being at an angle greater than 0° and less than 90° with respect to said axial gap, said at least one of said cylindrical roller bearing and said conical roller bearing being arranged in said roller bearing space, said roller bearing engaging said first part flat angular first surface or first part planar angular first surface, said first part flat angular second surface or first part planar angular second surface, said second part flat angular second surface or second part planar angular second surface and said second part flat angular first surface or second part planar angular first surface, wherein said at least one of said cylindrical roller bearing and said conical roller bearing is at an angle greater than 0° and less than 90° with respect to said axial gap, said at least one of said cylindrical roller bearing and said conical roller bearing transmitting radial and axial forces between said first spheroidal bearing surface and said second spheroidal bearing surface.

13. A ball and socket joint in accordance with claim 12, wherein said at least one of said cylindrical roller bearing and said conical roller bearing comprises one of a double-row angular ball bearing and a taper roller bearing.

14. A ball and socket joint in accordance with claim 12, further comprising:

a plastic bearing shell engaging said joint ball, said first part flat angular first surface or first part planar angular first surface being parallel to said second part flat angular first surface or second part planar angular first surface, wherein an axis of rotation of rollers of said at least one of said cylindrical roller bearing and said conical roller bearing forms an angle with said longitudinal axis of said ball pivot between 0° and 90°, said first part flat angular second surface or first part planar angular second surface and said second part flat angular second surface or second part planar angular second surface defining at least a portion of said roller bearing space, said first part flat angular second surface or first part planar angular second surface and said second part flat angular second surface or second part planar angular second surface being at another angular surface angle with respect to said axial gap.

15. A ball and socket joint in accordance with claim 14, wherein said angle of said axis of rotation of rollers of said at least one of said cylindrical roller bearing and said conical roller bearing is about 45°.

16. A ball and socket joint in accordance with claim 12, wherein said at least one of said cylindrical roller bearing and said conical roller bearing includes rollers arranged loosely in running track surfaces between said first part and said second part of said joint ball, said running track surfaces being at a running track surface angle with respect to said axial gap.

17. A ball and socket joint in accordance with claim 12, wherein said at least one of said cylindrical roller bearing and said conical roller bearing forms a rotating track.

18. A ball and socket joint in accordance with claim 12, further comprising a plastic bearing shell accommodated in said housing, wherein said joint ball as a whole is mounted pivotably in said bearing shell, said at least one of said cylindrical roller bearing and said conical roller bearing comprising a row of barrel-shaped rollers.

19. A ball and socket joint in accordance with claim 18, wherein said plastic bearing shell is manufactured from a material possessing elastic properties.

20. A ball and socket joint in accordance with claim 19, further comprising a retaining ring wherein said bearing shell is positioned in said housing by said retaining ring.

* * * * *